United States Patent Office 3,547,689
Patented Dec. 15, 1970

3,547,689
ETHYLENE POLYMER AND VINYLIDENE CHLORIDE POLYMER ARTICLES OF MANUFACTURE
Robert C. Whitney, Overland Park, and Raymond M. Bergman, Kansas City, Kans., assignors to Gulf Research & Development Company, Pittsburgh, Pa., a corporation of Delaware
No Drawing. Filed Dec. 12, 1967, Ser. No. 689,788
Int. Cl. B32b 27/08, 27/28
U.S. Cl. 117—138.8                                    12 Claims

ABSTRACT OF THE DISCLOSURE

The bonding between adjacent layers of an ethylene polymer containing substituent carboxylate salt groups and a vinylidene chloride polymer is substantially improved by incorporating into the coating polymer an alkaline wet strength resin.

BACKGROUND OF INVENTION

Vinylidene chloride polymers are useful in the packaging industry in the preparation of film having excellent gas resistant properties and in the preparation of films or other packaging materials where resistance to grease is essential. However, vinylidene chloride polymer films are brittle and attempts to overcome this disadvantage have included the preparation and use of articles of manufacture comprising a layer of the vinylidene chloride polymer film and a layer of a second flexible polymer film.

A flexible polymer film found to be particularly suitable in the preparation of the articles of manufacture is fabricated from an ethylene polymer containing pendent carboxylate salt groups. These articles of manufacture are difficult to prepare in that the vinylidene chloride polymer film does not readily adhere to the ethylene polymer film.

Accordingly, an object of this invention is to provide an article of manufacture comprising a layer of a vinylidene chloride polymer containing on at least one surface thereof an α-olefin polymer containing pendent carboxylate salt groups.

Another object of this invention is to provide improved adhesion between adjacent layers of a vinylidene chloride polymer and a lower α-olefin polymer containing pendent carboxylate salt groups.

Yet another object of this invention is to provide an improved method for preparing laminated structures comprising adjacent layers of a vinylidene chloride polymer and an α-olefin polymer containing pendent carboxylate salt groups.

Other objects, advantages and features of this invention will be readily apparent to those skilled in the art from the following description and appended claims.

SUMMARY OF THE INVENTION

By the invention a solid base layer of an α-olefin polymer containing substituent carboxylate salt groups is contacted with an aqueous dispersion of a vinylidene chloride polymer containing an alkaline wet strength resin or a vinylidene chloride polymer in the melt state containing dispersed therein an alkaline wet strength resin to provide an article of manufacture comprising a base layer of an α-olefin polymer containing a coating thereon of a vinylidene chloride polymer.

In a second embodiment of the invention, a solid base layer of a vinylidene chloride polymer is contacted with an aqueous dispersion of an α-olefin polymer having substituent carboxylate salt groups or such α-olefin polymer in the melt state, said dispersion or melt further containing an alkaline wet strength resin to provide an article of manufacture comprising a self-supporting base layer of a vinylidene chloride polymer containing thereon a coating of an α-olefin polymer.

DESCRIPTION OF THE INVENTION

The α-olefin polymers employed in preparing the laminated structures of the invention are polymers of α-olefins which have the general formula $RCH=CH_2$ where R is either a hydrogen or an alkyl group having preferably from 1 to 8 carbon atoms. Thus, suitable olefins include ethylene, propylene, butene-1, pentene-1, hexane-1, heptene-1, 3-methylbutene-1, 4-methylpentene-1, etc. Preferred α-olefins are ethylene and propylene. The concentration of the α-olefin is at least 50 mol percent of the α-olefin polymer.

An α-olefin polymer containing substituent carboxylate salt groups can be obtained by conventionally polymerizing an α-olefin as described above with an unsaturated nitrile, ester or acid and subsequently hydrolyzing or reacting with other suitable reagents to produce an α-olefin polymer containing substituent carboxylate salt groups. Suitable methods of preparing the α-olefin polymer containing substituent carboxylate salt groups are described in U.S. Pat. No. 3,264,272 and in copending application Ser. No. 131,108 filed Aug. 14, 1961, by Jack Hurst and Harry D. Anspon, said copending application and patent incorporated herein by reference.

Preferred α-olefin polymers employed in preparing the articles of manufacture of the invention include ethylene-alkyl acrylate copolymers wherein at least a portion of the substituent acrylate groups are converted to the carboxylate salt form, said copolymers containing from 0.01 to about 0.5 mol of acrylate groups per mol of contained ethylene groups. These ethylene polymers which are considered to be particularly applicable in preparing the articles of manufacture of this invention are selected from the groups consisting of:

(1) Polymers containing 67–99 (preferably 87–95.2) mol percent of units (a) and, correspondingly, 33–1 (preferably 13.0–4.8) mol percent of unit (b), (2) Polymers containing 67–99 (preferably 87–95.2) mol percent of units (a) and, correspondingly, 33–1 (preferably 13.0–4.8) mol percent of a mixture of units (b) and (c), (3) Polymers containing 67–99 (preferably 87–95.2) mol percent of units (a) and, correspondingly, 33–1 (preferably 13.0–4.8) mol percent of a mixture of units (b), (c) and (d), (4) Polymers containing 67–99 (preferably 87–95.2) mol percent of units (a) and, correspondingly, 33–1 (preferably 13.0–4.8) mol percent of a mixture of units (b), (c), (d) and (e), (5) Polymers containing 67–99 (preferably 87–95.2) mol percent of units (a) and, correspondingly, 33–1 (preferably 13.0–4.8) mol percent of a mixture of units (b) and (d), (6) Polymers containing 67–99 (preferably 87–95.2) mol percent of units (a) and, correspondingly, 33–1 (preferably 13.0–4.8) mol percent of a mixture of units (b) and (e), (7) Polymers containing 67–99 (preferably 87–95.2) mol percent of units (a) and, correspondingly, 33–1 (preferably 13.0–4.8) mol percent of a mixture of units (b), (c) and (e), (8) Polymers containing 67–99 (preferably 87–95.2) mol percent of units (a) and, correspondingly, 33–1 (preferably 13.0–4.8) mol percent of a mixture of units (b), (d) and (e), and (9) Mixtures of (1), (2), (3), (4), (5), (6), (7), and (8), said units (a) having the structure $$-CH_2-CH_2-$$

said units (b) having the structure

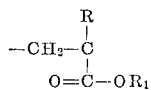

said units (c) having the structure

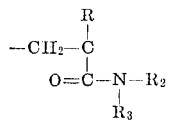

said units (d) having the structure

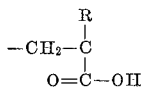

said units (e) having the structure

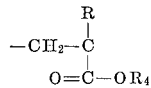

where R is selected from the group consisting of hydrogen and methyl, $R_1$ is selected from the group consisting of alkali metals, ammonium ion, silver, magnesium, zinc, cadmium, iron, cobalt, copper, calcium, aluminum, barium, titanium, tin, lead, chromium, quaternary ammonium ion, and amine complexes with the above metals, $R_2$ and $R_3$ are independently selected from the group consisting of hydrogen, methyl, ethyl, propyl, butyl, hydroxyethyl, morpholine and heterocyclic groups containing up to 22 carbon atoms, $R_4$ is a hydrocarbon group.

Although not to be limited thereto, the invention has been particularly effective in effecting excellent adhesion between adjacent vinylidene chloride polymer and ethylene-alkyl acrylate polymer surfaces wherein at least 30 percent of the acrylate groups are in carboxylate salt form.

The vinylidene chloride polymers employed in preparing the articles of manufacture of the invention include the vinylidene chloride homopolymer and copolymers of vinylidene chloride. Preferably the vinylidene chloride concentration comprises at least 50 percent by weight of the copolymer. Polymerizable mono-olefinic monomers which can be copolymerized with vinylidene chloride to prepare the vinylidene chloride polymers of this invention are the alkyl acrylates such as methyl and ethyl acrylate, acrylonitrile, vinyl chloride, vinyl acetate, methacrylonitrile, ethylmethacrylate, and methylvinyl ketone. However, invention is not limited to the above as any monomer which will copolymerize with vinylidene chloride may also be used. Suitable monomers include methyl, ethyl, isobutyl, butyl, octyl and 2-ethylhexyl acrylates and methacrylates; phenyl methacrylate, cyclohexyl methacrylate, p-cyclohexylphenyl methacrylate, methoxyethyl methacrylate, chloroethyl methacrylate, 2-nitro-2-methylpropyl methacrylate, and the corresponding esters of acrylic acid; methyl α-chloroacrylate, octyl α-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, methylene diethyl malonate, acrylamide, methacrylamide or mono-alkyl substitution products thereof, phenyl vinyl ketone, diethyl fumarate, diethyl maleate, methylene diethyl itaconate, dibutyl itaconate, vinyl pyridine, maleic anhydride, alkyl glycidyl ether and other unsaturated aliphatic ethers.

The alkaline wet strength resins useful in preparing the improved articles of manufacture of this invention include the polyamine-polyamide-epichlorohydrin wet strength resins which can be prepared by reacting adipic acid with diethylene triamine to form a polyamide-polyamine chain polymer. The reaction product is then further reacted with epichlorohydrin. The preparation of these wet strength resins is described in U.S. Pat. 2,926,154, incorporated herein by reference.

Self-supporting base layers or films can be prepared from the α-olefin polymers or the vinylidene chloride polymers by conventional fabrication techniques known to the industry. The techniques include melt-extrusion, casting films of the polymers from organic solutions or aqueous dispersions of such polymers, and the like.

In a first embodiment of the invention a solid base layer of the α-olefin polymer containing substituent carboxylate salt groups is contacted with an aqueous dispersion of the vinylidene chloride polymer containing an alkaline wet strength resin. The coating can be applied by passing the base film through the aqueous dispersion containing the coating composition, in a continuous manner or in a batch manner. The aqueous dispersion may also be sprayed onto the film, or applied manually by brushing or the like.

The thickness of the coating will normally range from about 0.1 mil to about 10 mils with a coating thickness 0.25 to 3 mils preferred to provide the desired barrier properties and to avoid any adverse effects of the heavier coatings on films which are subjected to heat shrinkage or thermoforming operations.

Another suitable method of applying a coating of the vinylidene chloride polymer onto the self-supporting α-olefin base layer comprises forming a melt of the vinylidene chloride polymer, dispersing the alkaline wet strength resin throughout the formed melt, and contacting by conventional means the α-olefin base layer with the vinylidene chloride polymer in melt form to provide the improved laminated structure of this invention.

In a second embodiment of the invention, a base layer of the vinylidene chloride polymer is contacted with an aqueous dispersion of the α-olefin polymer having substituent carboxylate salt groups, said aqueous dispersion containing an alkaline wet strength resin. The method of applying the α-olefin polymer coating to the vinylidene chloride base layer is similar to the method described in connection with the first embodiment.

It is essential in preparing the improved laminated structure wherein the α-olefin polymer comprises the base layer that the alkaline wet strength resin be intimately admixed with the coating composition prior to application of the coating composition to the base layer. In those instances wherein the self-supporting base layer is contacted with an aqueous dispersion of the coating polymer, it is preferred that the aqueous dispersion containing the alkaline wet strength resin be stabilized by adjusting the pH of the dispersion prior to contacting the base layer with the aqueous dispersion. When the coating polymer is an α-olefin polymer containing substituent carboxylate salt groups, the pH of the aqueous dispersion containing the alkaline wet strength resin is preferably adjusted to within the range of 9 to 12. When the coating polymer is a vinylidene chloride polymer, the pH of the aqueous dispersion containing the alkaline wet strength resin is preferably adjusted to a range of 5 to 9. An alternative and preferred method of stabilizing the aqueous dispersion comprises adjusting the pH of an aqueous dispersion of the alkaline wet strength resin and the aqueous dispersion of the coating polymer to a pH within a desired range prior to admixing the alkaline wet strength resin with the dispersed coating polymer. Normally the aqueous dispersion will contain a concentration of the alkaline wet strength resin in the range of 0.5 to 10 percent by weight of the total solids present in the aqueous dispersion. Preferably, the concentration of the alkaline wet strength resin will comprise at least 1 percent by weight of the total solids present in the aqueous dispersion.

The articles of manufacture of the invention have been found to be particularly suitable as paper coating compositions. In preparing the coated papers having improved barrier and heat-sealable properties, the base vinylidene chloride layer can be laminated to the paper by conventional coating techniques and the coated paper contacted with an aqueous dispersion of the coating α-olefin polymer employing the previously described coating process.

In addition to improved adhesion between adjacent surfaces of a vinylidene chloride polymer and an α-olefin polymer, the use of an alkaline wet strength resin when the α-olefin polymer is employed as the coating polymer substantially improves the moisture-vapor-transmission resistance of the resulting article of manufacture. The articles of manufacture of this invention have particular applicability in those areas where resistance to grease, moisture and gas is important and in those areas where flexible compositions are required and where improved heat-sealability is desired.

The following examples are presented to illustrate the objects and advantages of the invention. It is not intended that the invention should be limited to the specific embodiments presented therein.

EXAMPLE I

In each of the following examples the effectiveness of an alkaline wet strength resin to provide adhesion between adjacent surfaces of an ethylene polymer containing substituent sodium salt groups and a polyvinylidene chloride polymer is demonstrated. The ethylene polymer employed comprises an ethylene-methyl acrylate copolymer containing 20 weight percent methyl acrylate which has been hydrolyzed to provide a product polymer wherein 50 percent, 35 percent and 15 percent of the acrylate groups have been converted to the sodium salt, amide and acid forms, respectively. In each of the examples the base layer was applied as a precoat to a paper substrate and the coating layer applied as an overcoat to the precoated paper. The alkaline wet strength resin employed in each of the examples is a polyamine-polyamide-epichlorohydro resin marketed under the trade name Kymene 557 by Hercules.

Adhesion is measured in each example by applying Scotch[1] tape, ¾ inch in width, to the overcoat and observing the effect upon removing the Scotch tape. If no change in appearance, indicating a lack of partial or complete separation of the overcoat from the precoat, was observed, excellent adhesion between the adjacent polyvinylidene chloride and ethylene polymer layers is indicated. Any observed change upon removing the Scotch tape indicates that good adhesion was not obtained. As an additional adhesion test in some instances, the overcoat layer is cross-hatched and Scotch tape applied and removed as heretofore described. Again the effect on the laminated structures is noted.

In this example the above-described ethylene polymer is applied as a precoat to a paper substrate and the coated paper thereafter contacted with an aqueous dispersion having a pH of 3.2 and a Brookfield viscosity of 75 cps. (No. 3 spindle at 100 r.p.m.) and containing 61.5 weight percent polyvinylidene chloride solids to provide a polyvinylidene chloride overcoat.

The adhesion of the polyvinylidene chloride overcoat to the ethylene polymer precoat is determined after 2 hours, 2 days, 4 days and 10 days employing the above-described Scotch tape test. In each case poor adhesion is noted as the polyvinylidene overcoat is at least partially separated from the ethylene polymer precoat.

EXAMPLE II

In this example a polyvinylidene chloride polymer is applied to a paper substrate as a precoat and the coated paper thereafter contacted with an aqueous dispersion of the ethylene polymer of Example I containing 22.8 weight percent solids to provide an ethylene polymer overcoat. The pH of the aqueous dispersion is 10.05 and the Brookfield viscosity (No. 3 spindle—100 r.p.m.) is 515 cps.

The adhesion of the ethylene polymer overcoat to the polyvinylidene chloride precoat is determined after 2 hours, 2 days, 4 days and 10 days. In each case the ethylene polymer layer is at least partially separated from the polyvinylidene chloride precoat, indicating poor adhesion.

EXAMPLE III

In this example the effectiveness of the invention to provide excellent adhesion between adjacent surfaces of layers of a polyvinylidene chloride polymer and an ethylene polymer is demonstrated when the polyvinylidene chloride polymer is employed as the base layer. In each of the following runs 1–3 polyvinylidene chloride is applied as a precoat to a paper substrate and the coated paper thereafter contacted with the aqueous dispersion of the ethylene polymer of Example II containing Kymene 557. The Kymene 557 is introduced into the aqueous dispersion as a solution with the Kymene 557 solution having a pH as indicated in the following Table I. The pH and viscosity of the ethylene polymer aqueous dispersion containing Kymene 557 is also presented in the table. Adhesion tests as described above in Example I are run on the prepared polyvinylidene chloride polymer-ethylene polymer articles of manufacture with the results shown below in Table I:

TABLE I.—POLYMER OVERCOAT AQUEOUS DISPERSION

| Run | Wt. percent of total solids | pH of Kymene solution | Wt. percent solids | pH | Brookfield viscosity, cps.[1] | Adhesion 2 hours Tape pull | Tape pull of cross hatch | 2 days Tape pull | Tape pull of cross hatch | 4 days Tape pull | Tape pull of cross hatch | 10 days Tape pull | Tape pull of cross hatch |
|---|---|---|---|---|---|---|---|---|---|---|---|---|---|
| 1 | 2.0 | 5.0 | 22.2 | 9.8 | 562 | E[2] | E | E | E | E | E | E | E |
| 2 | 8.0 | 10.0 | 20.8 | 10.1 | 1,000+ | E | E | E | E | E | E | E | E |
| 3 | 0.5 | 5.0 | 22.6 | 10.0 | 519 | E | | E | E | E | E | E | E |

[1] 100 r.p.m.=No. 3 spindle.
[2] E=Excellent.

From the above and by comparison with the results obtained in Examples I and II it is apparent that the use of Kymene 557 in the ethylene coating polymer results in the production of an article of manufacture wherein excellent adhesion is obtained between the polyvinylidene chloride and ethylene polymers for concentrations of Kymene ranging from 0.5 to 8 weight percent of the total solids in the dispersion wherein the pH of the aqueous dispersion is in the range of 9.8 to 10.1.

EXAMPLE IV

In this example the effectiveness of the invention to provide excellent adhesion between adjacent surfaces of layers of a polyvinylidene chloride polymer and an ethylene polymer is demonstrated when the ethylene polymer is employed as a base layer. The ethylene polymer aqueous dispersion of Example II is applied as a precoat to a paper substrate and the coated paper thereafter contacted with the aqueous dispersion of the polyvinylidene chloride polymer of Example I containing Kymene 557 to provide an overcoat. The Kymene 557 is introduced into the aqueous dispersion as an aqueous solution which has

[1] A trademark of 3M Corporation.

been adjusted to a pH of 10.0. Prior to contacting the coated paper substrate with the aqueous dispersion of the polyvinylidene chloride polymer, the aqueous dispersion is adjusted to a pH of 7.0 with ammonium hydroxide. The concentration of the Kymene 557 in the aqueous dispersion is 2.0 weight percent of the total solids.

The prepared article of manufacture is conditioned at 90 percent relative humidity for 90 hours at 100° F. and adhesion of the adjacent layers of the polyvinylidene chloride polymer and ethylene polymer checked by the test procedures of Example I. The test results illustrate that excellent adhesion is obtained between the adjacent layers.

Although the invention has been described with reference to specific materials, embodiments and details, various modifications and changes, within the scope of this invention, will be apparent to one skilled in the art and are contemplated to be embraced in the invention.

We claim:

1. An article of manufacture comprising a base layer of an ethylene polymer selected from the groups consisting of:
   (1) polymers containing 67–99 mol percent of units (a) and, correspondingly, 33–1 mol percent of units (b),
   (2) polymers containing 67–99 mol percent of units (a) and, correspondingly, 33–1 mol percent of a mixture of units (b) and (c),
   (3) polymers containing 67–99 mol percent of units (a) and, correspondingly, 33–1 mol percent of a mixture of units (b), (c) and (d),
   (4) polymers containing 67–99 mol percent of units (a) and, correspondingly, 33–1 mol percent of a mixture of units (b), (c), (d) and (e),
   (5) polymers containing 67–99 mol percent of units (a) and, correspondingly, 33–1 mol percent of a mixture of units (b) and (d),
   (6) polymers containing 67–99 mol percent of units (a) and, correspondingly, 33–1 mol percent of a mixture of units (b) and (e),
   (7) polymers containing 67–99 mol percent of units (a) and, correspondingly, 33–1 mol percent of a mixture of units (b), (c) and (e),
   (8) polymers containing 67–99 mol percent of units (a) and, correspondingly, 33–1 mol percent of a mixture of units (b), (d) and (e), and
   (9) mixtures of (1), (2), (3), (4), (5), (6), (7) and (8), said units (a) having the structure

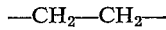

said units (b) having the structure

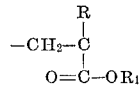

said units (c) having the structure

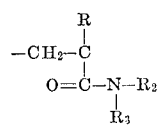

said units (d) having the structure

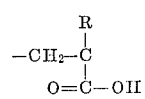

said units (e) having the structure

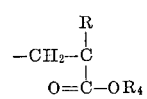

where R is selected from the group consisting of hydrogen and methyl, $R_1$ is selected from the group consisting of alkali metals, ammonium ion, silver, magnesium, zinc, cadmium, iron, cobalt, copper, calcium, aluminum, barium, titanium, tin, lead, chromium, quaternary ammonium ion, and amine complexes with the above metals, $R_2$ and $R_3$ are independently selected from the group consisting of hydrogen, methyl, ethyl, propyl, butyl, hydroxyethyl, morpholine and heterocyclic groups containing up to 22 carbon atoms, and $R_4$ is a hydrocarbon group, at least 30 percent of the substituent acrylate groups being in carboxylate salt form,
and a coating on at least one surface of said base layer comprising a vinylidene chloride polymer containing from 0.5 to 10 weight percent of a polyamine-polyamide-epichlorohydrin wet strength resin.

2. The article of manufacture of claim 1 wherein said carboxylate salt comprises an alkali metal salt.

3. The article of manufacture of claim 2 wherein the thickness of said coating is in the range from about 0.1 mil to about 10 mils.

4. An article of manufacture comprising an ethylene-alkyl acrylate polymer containing from about 0.01 to about 0.5 mol of acrylate groups per mol of contained ethylene groups, at least 30 percent of said acrylate groups being in carboxylate salt form, and a coating on at least one surface of said base layer comprising a vinylidene chloride polymer containing from 0.5 to 10 weight percent of a polyamine-polyamide-epichlorohydrin wet strength resin.

5. The article of manufacture of claim 4 wherein the thickness of said coating is in the range from about 0.1 mil to about 10 mils.

6. The article of manufacture of claim 4 wherein said carboxylate salt comprises an alkali metal salt.

7. An article of manufacture comprising a base layer of a vinylidene chloride polymer, and a coating on at least one surface of said base layer comprising an ethylene polymer selected from the groups consisting of:
   (1) polymers containing 67–99 mol percent of units (a) and, correspondingly, 33–1 mol percent of units (b),
   (2) polymers containing 67–99 mol percent of units (a) and, correspondingly, 33–1 mol percent of a mixture of units (b) and (c),
   (3) polymers containing 67–99 mol percent of units (a) and, correspondingly, 33–1 mol percent of a mixture of units (b), (c) and (d),
   (4) polymers containing 67–99 mol percent of units (a) and, correspondingly, 33–1 mol percent of a mixture of units (b), (c), (d) and (e),
   (5) polymers containing 67–99 mol percent of units (a) and, correspondingly, 33–1 mol percent of a mixture of units (b) and (d),
   (6) polymers containing 67–99 mol percent of units (a) and, correspondingly, 33–1 mol percent of a mixture of units (b) and (e),
   (7) polymers containing 67–99 mol percent of units (a) and, correspondingly, 33–1 mol percent of a mixture of units (b), (c) and (e),
   (8) polymers containing 67–99 mol percent of units (a) and, correspondingly, 33–1 mol percent of a mixture of units (b), (d) and (e), and
   (9) mixtures of (1), (2), (3), (4), (5), (6), (7) and (8) said units (a) having the structure

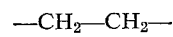

said units (b) having the structure

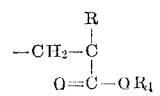

said units (c) having the structure

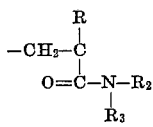

said units (d) having the structure

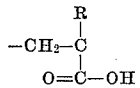

said units (e) having the structure

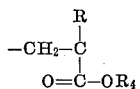

where R is selected from the group consisting of hydrogen and methyl, $R_1$ is selected from the group consisting of alkali metals, ammonium ion, silver, magnesium, zinc, cadmium, iron, cobalt, copper, calcium, aluminum, barium, titanium, tin, lead, chromium, quaternary ammonium ion, and amine complexes with the above metals, $R_2$ and $R_3$ are independently selected from the group consisting of hydrogen, methyl, ethyl, propyl, butyl, hydroxyethyl, morpholine and heterocyclic groups containing up to 22 carbon atoms, and $R_4$ is a hydrocarbon group, at least 30 percent of the substituent acrylate groups being in carboxylate salt form, said ethylene polymer containing from 0.5 to 10 weight percent of a polyamine-polyamide-epichlorohydrin wet strength resin.

8. The article of manufacture of claim 7 wherein said carboxylate salt comprises an alkali metal salt.

9. The article of manufacture of claim 8 wherein the thickness of said coating is in the range from about 0.1 mil to about 10 mils.

10. An article of manufacture comprising a base layer of a vinylidene chloride polymer, and a coating on at least one surface of said base layer comprising an ethylene-alkyl acrylate polymer containing from about 0.01 to about 0.5 mol of acrylate groups per mol of contained ethylene groups, at least 30 percent of said acrylate groups being in carboxylate salt form, said coating further containing from 0.5 to 10 percent by weight of a polyamine-polyamide-epichlorohydrin wet strength resin.

11. The article of manufacture of claim 10 wherein said carboxylate salt comprises an alkali metal salt.

12. The article of manufacture of claim 11 wherein the thickness of said coating is in the range from about 0.1 mil to about 10 mils.

References Cited

UNITED STATES PATENTS

| | | | |
|---|---|---|---|
| 3,338,739 | 8/1967 | Rees | 260—80.8 |
| 3,371,002 | 2/1968 | Reddeman | 117—161UHH |
| 3,355,319 | 11/1967 | Rees | 117—138.8E |

WILLIAM D. MARTIN, Primary Examiner

J. E. MILLER, JR., Assistant Examiner

U.S. Cl. X.R.

117—161; 161—256; 260—857